United States Patent
Fei et al.

(10) Patent No.: US 12,480,153 B2
(45) Date of Patent: Nov. 25, 2025

(54) PRIMER AND PROBE COMPOSITION FOR CAT BLOOD TYPE DETECTION, DETECTION METHOD, AND USE

(71) Applicants: Soochow University, Suzhou (CN); Suzhou Sundia Innovation Biotechnology Co., Ltd., Suzhou (CN)

(72) Inventors: Min Fei, Jiangsu (CN); Yingchao Wu, Jiangsu (CN); Weiwei Li, Jiangsu (CN); Yifeng Cao, Jiangsu (CN); Kaiye Lu, Jiangsu (CN); Waner Yan, Jiangsu (CN); Zhaoqin Fei, Jiangsu (CN); Dongning Zhu, Jiangsu (CN); Lijun Lu, Jiangsu (CN)

(73) Assignees: Soochow University, Suzhou (CN); Suzhou Sundia Innovation Biotechnology Co., Ltd., Suzhou (CN)

( * ) Notice: Subject to any disclaimer, the term of this patent is extended or adjusted under 35 U.S.C. 154(b) by 0 days.

(21) Appl. No.: 18/938,479

(22) Filed: Nov. 6, 2024

(65) Prior Publication Data
US 2025/0163499 A1    May 22, 2025

(30) Foreign Application Priority Data
Nov. 21, 2023   (CN) .......................... 202311555275.7

(51) Int. Cl.
*C12Q 1/6827* (2018.01)
*C12Q 1/6806* (2018.01)
*C12Q 1/686* (2018.01)
*C12Q 1/6876* (2018.01)

(52) U.S. Cl.
CPC ......... *C12Q 1/6827* (2013.01); *C12Q 1/6806* (2013.01); *C12Q 1/686* (2013.01); *C12Q 1/6876* (2013.01); *C12Q 2600/124* (2013.01); *C12Q 2600/156* (2013.01)

(58) Field of Classification Search
None
See application file for complete search history.

(56) References Cited

FOREIGN PATENT DOCUMENTS

| CN | 115717170 A | * | 2/2023 |
| DE | 102017124998 B3 | * | 4/2019 | ........... C12Q 1/6881 |

OTHER PUBLICATIONS

Kehl et al. CMAH genotyping survey for blood types A, B and C (AB) in purpose-bred cats. Anim Genet. Jun. 2019;50(3):303-306. doi: 10.1111/age.12778. Epub Mar. 10, 2019. PMID: 30854707; PMCID: PMC6520129; cited as NPL#1 in IDS filed Nov. 6, 2024 (Year: 2019).*

TaqMan® SNP Genotyping Assays User Guide—Pub. No. MAN0009593—Rev. A.0; Published in 2014 (Year: 2014).*

Kehl et al. Molecular characterization of blood type A, B, and C (AB) in domestic cats and a CMAH genotyping scheme. PLoS One. Sep. 20, 2018;13(9):e0204287. doi: 10.1371/journal.pone.0204287. PMID: 30235335; PMCID: PMC6147723 (Year: 2018).*

"CMAH genotyping survey for blood types A, B and C (AB) in purpose-bred cats", Alexandra Kehl et al., Anim Genet, vol. 50, No. 3 : 303-306. doi:10.1111/age.12778 (available in PMC Jun. 1, 2020).

CNIPA, Notification of First Office Action for CN2023115552757, Dec. 28, 2023.

CNIPA, Notification to grant patent right for invention in CN2023115552757, Feb. 4, 2024.

* cited by examiner

*Primary Examiner* — Aaron A Priest
*Assistant Examiner* — Tian Nmn Yu
(74) *Attorney, Agent, or Firm* — Zhigang Ma (57) ABSTRACT

Provided are a primer and probe composition for cat blood type detection, a detection method, and use. The primer and probe composition for detecting the wild-types and the mutants of the above four sites is designed according to the single nucleotide polymorphism (SNP) mutation of genotyping of 179G>T, 268T>A, 364C>T and 1322delT four sites of a cat cytidine monophospho-N-acetylneuraminic acid (CMAH) gene; an amplification curve is plotted by utilizing a real-time fluorescence polymerase chain reaction (PCR) technology, and the recognition of bases of four SNP sites is achieved by analysis of the amplification curve, so as to determine cat blood types. The detection method of the present disclosure is carried out entirely in a closed space, thereby avoiding the problem of environmental aerosol pollution.

12 Claims, 6 Drawing Sheets

Specification includes a Sequence Listing.

```
                             SEQUENCE LISTING

Sequence total quantity: 18
SEQ ID NO: 1            moltype = DNA   length = 23
FEATURE                 Location/Qualifiers
source                  1..23
                        mol_type = other DNA
                        organism = synthetic construct
SEQUENCE: 1
cattctgtac aagagcaaga atc                                                23

SEQ ID NO: 2            moltype = DNA   length = 19
FEATURE                 Location/Qualifiers
source                  1..19
                        mol_type = other DNA
                        organism = synthetic construct
SEQUENCE: 2
gacagacctt ccgtctaaa                                                     19

SEQ ID NO: 3            moltype = DNA   length = 26
FEATURE                 Location/Qualifiers
source                  1..26
                        mol_type = other DNA
                        organism = synthetic construct
SEQUENCE: 3
caagcatcaa ggaggcctgt tcataa                                             26

SEQ ID NO: 4            moltype = DNA   length = 26
FEATURE                 Location/Qualifiers
source                  1..26
                        mol_type = other DNA
                        organism = synthetic construct
SEQUENCE: 4
caagcatcaa ggagtcctgt tcataa                                             26

SEQ ID NO: 5            moltype = DNA   length = 21
FEATURE                 Location/Qualifiers
source                  1..21
                        mol_type = other DNA
                        organism = synthetic construct
SEQUENCE: 5
agatgcacaa agcacaactg g                                                  21

SEQ ID NO: 6            moltype = DNA   length = 20
FEATURE                 Location/Qualifiers
source                  1..20
                        mol_type = other DNA
                        organism = synthetic construct
SEQUENCE: 6
ctagttcgtc ttgacagaag                                                    20

SEQ ID NO: 7            moltype = DNA   length = 26
FEATURE                 Location/Qualifiers
source                  1..26
                        mol_type = other DNA
                        organism = synthetic construct
SEQUENCE: 7
caccatgaaa tacgtcaatc ccccag                                             26

SEQ ID NO: 8            moltype = DNA   length = 26
FEATURE                 Location/Qualifiers
source                  1..26
                        mol_type = other DNA
                        organism = synthetic construct
SEQUENCE: 8
caccatgaaa aacgtcaatc ccccag                                             26

SEQ ID NO: 9            moltype = DNA   length = 27
FEATURE                 Location/Qualifiers
source                  1..27
                        mol_type = other DNA
                        organism = synthetic construct
SEQUENCE: 9
aaatggatga agaaaatgga cttttac                                            27
```

```
SEQ ID NO: 10            moltype = DNA  length = 22
FEATURE                  Location/Qualifiers
source                   1..22
                         mol_type = other DNA
                         organism = synthetic construct
SEQUENCE: 10
tccaaaagcc aaatgttcag ga                                              22

SEQ ID NO: 11            moltype = DNA  length = 25
FEATURE                  Location/Qualifiers
source                   1..25
                         mol_type = other DNA
                         organism = synthetic construct
SEQUENCE: 11
ctgaatcctc ccaatccctg ggatt                                           25

SEQ ID NO: 12            moltype = DNA  length = 25
FEATURE                  Location/Qualifiers
source                   1..25
                         mol_type = other DNA
                         organism = synthetic construct
SEQUENCE: 12
ctgaatcctc ccaattcctg ggatt                                           25

SEQ ID NO: 13            moltype = DNA  length = 23
FEATURE                  Location/Qualifiers
source                   1..23
                         mol_type = other DNA
                         organism = synthetic construct
SEQUENCE: 13
aggacccgac agacagcaag ggc                                             23

SEQ ID NO: 14            moltype = DNA  length = 21
FEATURE                  Location/Qualifiers
source                   1..21
                         mol_type = other DNA
                         organism = synthetic construct
SEQUENCE: 14
gtgaagtatt cttttatcca g                                               21

SEQ ID NO: 15            moltype = DNA  length = 24
FEATURE                  Location/Qualifiers
source                   1..24
                         mol_type = other DNA
                         organism = synthetic construct
SEQUENCE: 15
tttgaaccct atttgaacat cttg                                            24

SEQ ID NO: 16            moltype = DNA  length = 23
FEATURE                  Location/Qualifiers
source                   1..23
                         mol_type = other DNA
                         organism = synthetic construct
SEQUENCE: 16
tttgaaccct attgaacatc ttg                                             23

SEQ ID NO: 17            moltype = DNA  length = 466
FEATURE                  Location/Qualifiers
source                   1..466
                         mol_type = other DNA
                         organism = synthetic construct
SEQUENCE: 17
tttcattctg tacaagagca agaatcgcgt gagggcgtgc aagaacgtgt gcaagcatca      60
aggaggcctg ttcataaaag acatagaaga tttagacgga aggtctgtca gatgcacaaa    120
gcacaactgg aggttggatg tgagcaccat gaaatacgtc aatccccag gcagcttctg     180
tcaagacgaa ctagttgttg aaatggatga agaaaatgga cttttacttc tagaactgaa    240
tcctcccaat ccctgggatt cagaacccag atctcctgaa catttggctt ttggagaagt    300
tgctaaagga cccgacagac agcaagggca tcatagarcc tccagagggg accaagatct    360
acaaggattc ctgggacttt gaaccctatt tgaacatctt gaatgctgct gtaggagatg    420
agatatttct tcactcatcc tggataaaag aatacttcac ttgggc                   466

SEQ ID NO: 18            moltype = DNA  length = 466
FEATURE                  Location/Qualifiers
source                   1..466
                         mol_type = other DNA
                         organism = synthetic construct
SEQUENCE: 18
tttcattctg tacaagagca agaatcgcgt gagggcgtgc aagaacgtgt gcaagcatca      60
```

```
aggagtcctg ttcataaaag acatygaaga tttagacgga aggtctgtca gatgcacaaa    120
gcacaactgg aggttggatg tgagcaccat gaaaaacgtc aatcccccag gcagcttctg    180
tcaagacgaa ctagttgttg aaatggatga agaaaatgga cttttacttc tagaactgaa    240
tcctcccaat tcctgggatt cagaacccag atctcctgaa catttggctt ttggagaagt    300
tgctaaagga cccgacagac agcaagggca tcatagarcc tccagagggg accaagatct    360
acaaggattc ctgggacttt gaaccctatt tgaacatctt gaatgctgct gtaggagatg    420
agatatttct tcactcatcc tggataaaag aatacttcac ttgggc                   466
```

PRIMER AND PROBE COMPOSITION FOR CAT BLOOD TYPE DETECTION, DETECTION METHOD, AND USE

CROSS REFERENCE TO RELATED APPLICATION

This non-provisional patent application claims priority under 35 U.S.C. § 119 from Chinese Patent Application No. 202311555275.7 filed on Nov. 21, 2023, the entire content of which is incorporated herein by reference.

STATEMENT REGARDING SEQUENCE LISTING

The sequence listing associated with this application is provided in text format in lieu of a paper copy and is hereby incorporated by reference into the specification. The name of the XML file containing the sequence listing is Sample.xml. The XML file is 17,823 bytes; is created on Nov. 5, 2024; and is being submitted electronically via patent center.

TECHNICAL FIELD

The present disclosure relates to the technical field of bioassay, and particularly to a primer and probe composition for cat blood type detection, a detection method, and use.

BACKGROUND

A cat blood type system is generally recognized as an AB blood type system, including 3 blood types: type A, type B and type AB. Among them, type A is the most common, in different breeds, the blood type A of the cat is up to 90%. The recessive and dominant relationship among type A, type B and type AB is as follows: type A dominance>type AB dominance>type B dominance.

In the existing technology, the SNP mutation of four sites including 179G>T, 268T>A, 364C>T and 1322delT in a cat CMAH gene is detected by designing primers, and then genotyping results are interpreted in combination with a PCR technology. For example, Chinese invention patent CN115717170A discloses a method for detecting a cat blood type by using a SNaPshot technology. According to the SNAPshot genotyping technology, 4 SNP site primers are designed and amplification primers are subjected to blast specificity comparison. The method has the advantages of short detection time and high sensitivity, especially has significant advantage in detection specificity, however, the method requires to conduct purification, extension and re-purification on the product after amplification, the post-treatment process is too complicated, and the treatment of the product easily causes serious aerosol pollution.

SUMMARY

In order to solve the technical problems in the prior art, the present disclosure provides a primer and probe composition for cat blood type detection, a detection method, and use. The detection of the cat blood type is performed by utilizing a polymerase chain reaction (PCR) technology in combination with a real-time fluorescence technology, the specific design of the primer and the probe is performed according to the mutation of the four sites of the cat cytidine monophospho-N-acetylneuraminic acid (CMAH) gene, and amplification curves are plotted by a real-time fluorescence PCR instrument, thereby precisely analyzing the four single nucleotide polymorphism (SNP) sites to obtain cat blood type results. The entire detection process is carried out under a closed condition without opening a lid, thereby avoiding the pollution caused by aerosol.

In order to achieve the above objective, the present disclosure provides the following technical solutions. One of the technical solutions is to provide a primer and probe composition for cat blood type detection, the primer and probe composition being specifically designed by detecting the mutation of single nucleotide mutation sites of a cat blood type, and comprising four groups of primers and four groups of probes.

Specifically, the four groups of primers designed according to the four SNP sites of the cat CMAH gene respectively comprise:

Four Groups of Primers:
  A first group of primers comprising a forward primer having a sequence of SEQ ID NO.1 and a reverse primer having a sequence of SEQ ID NO.2;
  A second group of primers comprising a forward primer having a sequence of SEQ ID NO.5 and a reverse primer having a sequence of SEQ ID NO.6;
  A third group of primers comprising a forward primer having a sequence of SEQ ID NO.9 and a reverse primer having a sequence of SEQ ID NO.10;
  A fourth group of primers comprising a forward primer having a sequence of SEQ ID NO.13 and a reverse primer having a sequence of SEQ ID NO.14;

Four Groups of Probes:
  A first group of probes comprising a wild-type probe having a sequence of SEQ ID NO.3 and a mutant probe having a sequence of SEQ ID NO.4;
  A second group of probes comprising a wild-type probe having a sequence of SEQ ID NO.7 and a mutant probe having a sequence of SEQ ID NO.8;
  A third group of probes comprising a wild-type probe having a sequence of SEQ ID NO.11 and a mutant probe having a sequence of SEQ ID NO.12;
  A fourth group of probes comprising a wild-type probe having a sequence of SEQ ID NO.15 and a mutant probe having a sequence of SEQ ID NO.16.

Further, the primer and probe composition provided by adopting the above solution is used to prepare a cat blood type detection reagent to conduct the detection and analysis of the cat blood type. Specifically, the detection reagent comprises the above primer and probe composition, and also comprises a positive reference comprising a wild-type positive reference and a mutant positive reference.

Specifically, the wild-type positive reference comprises a wild-type specific plasmid fragment having a sequence of SEQ ID NO.17; the mutant positive reference comprises a mutant specific plasmid fragment having a sequence of SEQ ID NO.18.

Further, the method for detection and analysis of the cat blood type comprises: designing specific primers and probes by detecting the mutation of the single nucleotide mutation sites of the cat blood type, performing PCR reaction by using a nucleic acid on the body surface of the cat as template DNA, and then plotting an amplification curve by utilizing the real-time fluorescence PCR technology, thereby performing analysis and result interpretation on the four SNP sites to obtain the cat blood type results.

Preferably, the four mutation sites are designed in the middles of the probes, and the Tm values of the probes are kept consistent with the annealing temperatures of the probes; when the template DNA undergoes base mutation, it will cause relatively low melting temperatures of the probe and the template DNA, thus an annealing temperature will be greater than the melting temperatures of the probe and the template DNA so that the probe cannot bind to the template DNA and then the amplification curve cannot be analyzed, and the results are interpreted as negative; if the temperature DNA does not undergo base mutation, the probe and the template DNA can be complemented and bind with each other, and then the amplification curve can be analyzed, and the results are interpreted as positive.

Preferably, the four groups of primers designed according to the four SNP sites of the cat CMAH gene respectively comprise:

A first group of primers comprising a forward primer (179F) having a sequence of SEQ ID NO.1 and a reverse primer (179R) having a sequence of SEQ ID NO.2 for detecting 179G>T;

A second group of primers comprising a forward primer (268F) having a sequence of SEQ ID NO.5 and a reverse primer (268R) having a sequence of SEQ ID NO.6 for detecting 268T>A;

A third group of primers comprising a forward primer (364F) having a sequence of SEQ ID NO.9 and a reverse primer (364R) having a sequence of SEQ ID NO.10 for detecting 364C>T;

A fourth group of primers comprising a forward primer (1322F) having a sequence of SEQ ID NO.13 and a reverse primer (1322R) having a sequence of SEQ ID NO.14 for detecting 1322delT.

The four groups of probes designed according to the mutation of the four SNP sites of the cat CMAH gene respectively comprise:

A first group of probes comprising a wild-type probe (179WP) having a sequence of SEQ ID NO.3 and a mutant probe (179MP) having a sequence of SEQ ID NO.4 for detecting 179G>T;

A second group of probes comprising a wild-type probe (268WP) having a sequence of SEQ ID NO.7 and a mutant probe (268MP) having a sequence of SEQ ID NO.8 for detecting 268T>A;

A third group of probes comprising a wild-type probe (364WP) having a sequence of SEQ ID NO.11 and a mutant probe (364MP) having a sequence of SEQ ID NO.12 for detecting 364C>T;

A fourth group of probes comprising a wild-type probe (1322WP) having a sequence of SEQ ID NO.15 and a mutant probe (1322MP) having a sequence of SEQ ID NO.16 for detecting 1322delT.

Preferably, the cat blood type detection and analysis method specifically comprises the following steps:

S1, respectively designing one group of primers and probes for detecting wild-type and one group of primers and probes for detecting mutation type according to the SNP mutation of 179G>T, 268T>A, 364C>T and 1322delT four sites of the cat blood type gene, with four groups of primers and probes in total, and preparing the above four groups of primers and probes into detection solutions;

S2, extracting nucleic acid from a cat oral swab as a to-be-detected sample, and mixing the to-be-detected sample with the detection solutions;

S3, performing procedure running through a fluorescence PCR instrument to plot an amplification curve; and S4, performing analysis and result interpretation on the four SNP sites of the cat CMAH gene in the to-be-detected sample according to the amplification curve obtained in S3 to obtain the blood type of the cat.

Preferably, the detection solutions comprise a wild-type detection solution and a mutant detection solution; the sample is respectively added into the wild-type detection solution and the mutant detection solution for detection of a wild site and a mutant site, the wild-type detection solution detects the wild-type site, and the mutant detection solution detects whether the site is mutated.

Preferably, the positive reference comprises a specific plasmid fragment synthesized by a detected target gene;

The positive reference comprises a wild-type positive reference and a mutant positive reference;

The final concentration of the wild-type positive reference is $10^5$-$10^7$ copies/mL;

The final concentration of the mutant positive reference is $10^5$-$10^7$ copies/mL.

Preferably, the specific plasmid fragment comprises a wild-type specific plasmid fragment and a mutant specific plasmid fragment; the sequence of the wild-type specific plasmid fragment is as shown in SEQ ID NO.17; the sequence of the mutant specific plasmid fragment is as shown in SEQ ID NO.18.

Preferably, in S3, the procedure running comprises respectively placing nucleic acid and positive control as well as blank control in the real-time fluorescence PCR instrument, and setting the following procedures for running:

Step ①: 95° C.×5 min, running for 1 cycle;

Step ②: 95° C.×5 s; 60° C.×20 s; running for 45 cycles;

In step ②, respectively setting FAM channel, VIC channel, ROX channel and CY5 channel when 60° C.×20 s for fluorescence collection;

Where the gene site detected in the FAM channel is 179G>T; the gene site detected in the VIC channel is 268T-A; the gene site detected in the ROX channel is 268T-A, and the gene site detected in the CY5 channel is 1322delT.

Preferably, in S4, the fluorescence collection results are analyzed, which comprises: analyzing whether an amplification signal is present, the fluorescence collection result is directly interpreted as negative if no amplification signal is present, and the template DNA is positive if the amplification signal is present.

The above technical solution can be applied to determine whether the cat CMAH gene is homozygous. The determination of whether the cat CMAH gene is homozygous is achieved by simultaneously detecting the sample with wild-type and mutant reagents. Its particular principle is as follows: a homozygote refers to a genotype individual with two identical alleles at the same site on homologous chromosomes in a diploid. A heterozygote refers to a genotype individual with two different alleles at the same site on homologous chromosomes in a diploid. If wild-type and mutant detections in the sample are both interpreted as positive, namely, two alleles at the same site are different and comprise both wild-type allele and mutant allele, indicating that the detection site in this sample is homozygous; if the wild-type in the sample is interpreted as positive and the mutant is interpreted as negative, namely, the alleles at the same site are the same and both wild-type, indicating that the detection site of the sample is dominant homozygous; if the wild-type in the sample is interpreted as negative and the mutant is interpreted as positive, namely, the alleles at the same site are the same and both mutant, indicating that the detection site of the sample is recessive homozygous.

Compared with the prior art, the technical solution provided by the present disclosure has the beneficial effects:

1. In the technical solution provided by the present disclosure, the primer and probe composition for detecting the wild-types and the mutants is designed separately according to the SNP mutation of four sites (179G>T, 268T>A, 364C>T and 1322delT) in the cat CMAH. The amplification curve is plotted by using a PCR technology combined with a real-time fluorescent technology to determine the blood type of the cat. The whole process is carried out in a closed environment, to avoid the problem of environmental aerosol pollution.

2. By using the technical solution of the present disclosure, the amplification time is less than 1 h, the detection rate is quick, especially, the primer and probe design for the cat CMAH gene makes the detection results highly specific.

3. By the technical solution of the present disclosure, a nucleic acid concentration of 1000 copies/mL can be detected, with the characteristic of high detection sensitivity.

4. By the technical solution of the present disclosure, the blood type of the cat can be determined, and whether the cat CMAH gene is homozygous is determined as well.

DETAILED DESCRIPTION OF THE EMBODIMENTS

To make the purpose, technical solution and advantages of the embodiments of the present disclosure more clear, the technical solutions in the embodiments of the present disclosure will be clearly and completely described, obviously, the described embodiments are some embodiments of the present application, but not all the embodiments. Based on the embodiments of the present disclosure, other embodiments obtained by persons of ordinary skill in the art without creative efforts should be included within the scope of protection of the present disclosure.

TABLE 1

Designed primer probe sequence

| Sequence | Name | Nucleotide sequence (3'-5') |
|---|---|---|
| SEQ ID NO. 1 | 179F | CATTCTGTACAAGAGCAAGAATC |
| SEQ ID NO. 2 | 179R | GACAGACCTTCCGTCTAAA |
| SEQ ID NO. 3 | 179WP | FAM-CAAGCATCAAGGAGGCCTGTTCATAA-BHQ1 |
| SEQ ID NO. 4 | 179MP | FAM-CAAGCATCAAGGAGTCCTGTTCATAA-BHQ1 |
| SEQ ID NO. 5 | 268F | AGATGCACAAAGCACAACTGG |
| SEQ ID NO. 6 | 268R | CTAGTTCGTCTTGACAGAAG |
| SEQ ID NO. 7 | 268WP | VIC-CACCATGAAATACGTCAATCCCCCAG-BHQ1 |
| SEQ ID NO. 8 | 268MP | VIC-CACCATGAAAAACGTCAATCCCCCAG-BHQ1 |
| SEQ ID NO. 9 | 364F | AAATGGATGAAGAAAATGGACTTTTAC |
| SEQ ID NO. 10 | 364R | TCCAAAAGCCAAATGTTCAGGA |
| SEQ ID NO. 11 | 364WP | ROX-CTGAATCCTCCCAATCCCTGGGATT-BUQ2 |
| SEQ ID NO. 12 | 364MP | ROX-CTGAATCCTCCCAATTCCTGGGATT-BHQ2 |
| SEQ ID NO. 13 | 1322F | AGGACCCGACAGACAGCAAGGGC |
| SEQ ID NO. 14 | 1322R | GTGAAGTATTCTTTTATCCAG |
| SEQ ID NO. 15 | 1322WP | CY5-TTTGAACCCTATTTGAACATCTTG-BHQ3 |
| SEQ ID NO. 16 | 1322MP | CY5-TTTGAACCCTATTGAACATCTTG-BHQ3 |

Referring to FIGS. 1-4, FIG. 1-FIG. 4 are principle diagrams of primer and probe composition design according to the present disclosure. Mutation sites are designed in the middle of the probe, and the base of template DNA is completely complementary to the bases of the primer and the probe. If the template DNA undergoes base mutation, the probe cannot bind to, or completely bind to the template DNA, so as not to analyze the amplification curve.

Figure 1:
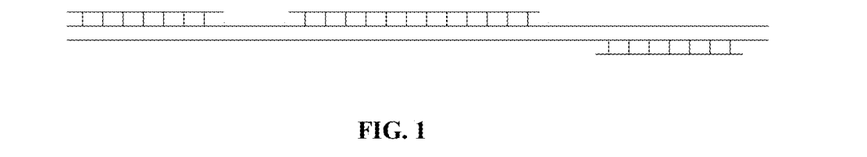
FIGS. 1-4 are principle graphs for cat blood type analysis according to the present disclosure, respectively.
Figure 2:
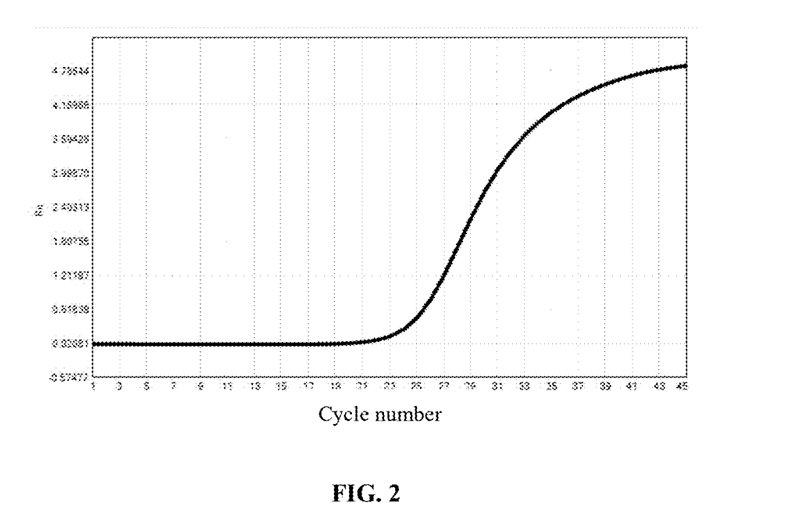
Figure 3:
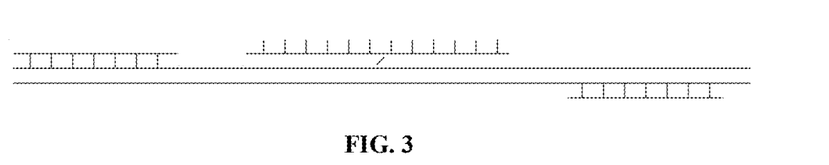
Figure 4:
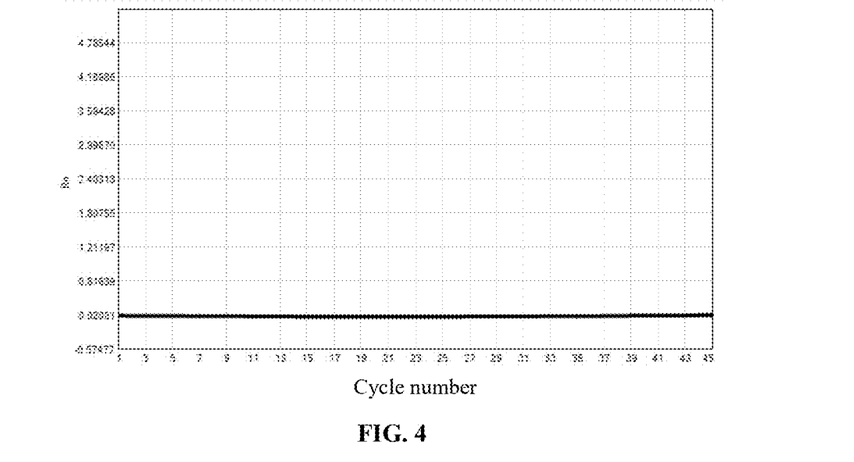

Specifically, referring to FIG. 1, the primer and the probe are completely complementary to the template DNA, and the amplification curve as shown in FIG. 2 can be plotted by using a fluorescent PCR instrument; referring to FIG. 3, when the probe contains mutation, and does not bind to or cannot completely bind to the template, the fluorescent PCR instrument cannot plot the amplification curve. The results are as shown in FIG. 4.

Via further analysis, 179G>T, 268T>A, 364C>T and 1322delT four mutation sites are designed in the middle of the probe, the Tm value of the probe is kept consistent to the annealing temperature of the probe; when the template DNA undergoes base mutation, the melting temperature between the probe and the template DNA is too low, and therefore the annealing temperature is greater than the melting temperature between the probe and the template DNA so that the probe cannot bind to the template DNA, so as not to analyze the amplification curve, thus the results are interpreted as negative; if the template DNA does not undergo base mutation, the probe can be complementary to and bind to the template DNA, thereby analyzing the amplification curve, thus the results are interpreted as positive.

TABLE 2

Compositions and ratios of detection solutions

| Name | Wild-type detection solution | | Mutant detection solution | |
|---|---|---|---|---|
| | Reaction concentration | Reaction volume | Reaction concentration | Reaction volume |
| 179F | 500 nM | 0.125 μL | 500 nM | 0.125 μL |
| 179R | 500 nM | 0.125 μL | 500 nM | 0.125 μL |
| 179WP | 300 nM | 0.075 μL | 0 nM | 0 μL |
| 179MP | 0 nM | 0 μL | 300 nM | 0.075 μL |
| 268F | 500 nM | 0.125 μL | 500 nM | 0.125 μL |
| 268R | 500 nM | 0.125 μL | 500 nM | 0.125 μL |
| 268WP | 300 nM | 0.05 μL | 0 nM | 0 μL |
| 268MP | 0 nM | 0 μL | 300 nM | 0.075 μL |
| 364F | 500 nM | 0.125 μL | 500 nM | 0.125 μL |
| 364R | 500 nM | 0.125 μL | 500 nM | 0.125 μL |
| 364WP | 300 nM | 0.075 μL | 0 nM | 0 μL |
| 364MP | 0 nM | 0 μL | 300 nM | 0.05 μL |
| 1322F | 500 nM | 0.125 μL | 500 nM | 0.125 μL |
| 1322R | 500 nM | 0.125 μL | 500 nM | 0.125 μL |
| 1322WP | 300 nM | 0.075 μL | 0 nM | 0 μL |
| 1322MP | 0 nM | 0 μL | 300 nM | 0.075 μL |
| Buffer | / | 6.6525 μL | / | 6.6525 μL |
| Enzyme | / | 2 μL | / | 2 μL |
| TE buffer | / | 10.0725 μL | / | 10.0725 μL |
| Total volume | / | 20 μL | / | 20 μL |

Based on the above principle, the four groups of primers are designed according to four SNP sites of the cat CMAH gene; where the four groups of primers respectively comprise a first group of forward primer 179F and reverse primer 179R for detecting 179G>T, a second group of forward primer 268F and reverse primer 268R for detecting 268T>A, a third group of forward primer 364F and reverse primer 364R for detecting 364C>T, and a fourth group of forward primer 1322F and reverse primer 1322R for detecting 1322delT.

Further, eight probes (four groups of probes) are designed according to SNP change of the CMAH gene, two probes are wild-type probe 179WP and mutant probe 179MP for detecting 179G>T, two probes are wild-type probe 268WP and mutant probe 268MP for detecting 268T>A, two probes are wild-type probe 364WP and mutant probe 364MP for detecting 364C>T, and two probes are wild-type probe 1322WP and mutant probe 1322MP for detecting 1322delT.

The sequences of the primers with names 179F, 179R, 268F, 268R, 364F, 364R, 1322F and 1322R correspond to SEQ ID NO.1, SEQ ID NO.2, SEQ ID NO.5, SEQ ID NO.6, SEQ ID NO.9, SEQ ID NO.10, SEQ ID NO.13 and SEQ ID NO.14, respectively. The specific sequences are seen in Table 1.

The probes with names 179WP, 268WP, 364WP and 1322WP respectively are wild-type probes, and their sequences are SEQ ID NO.3, SEQ ID NO.7, SEQ ID NO.11 and SEQ ID NO.15, respectively. The probes with names 179MP, 268MP, 364MP and 1322MP respectively are mutant probes, and their sequences are SEQ ID NO.4, SEQ ID NO.8, SEQ ID NO.12 and SEQ ID NO.16, respectively. The specific sequences are seen in Table 1.

The synthesized primers and PCR reagents are prepared into detection solutions according to concentrations shown in Table 2. The detection solutions respectively comprise a wild-type detection solution and a mutant detection solution. The wild-type detection solution is used as a first detection solution, and the mutant detection solution is used as a second detection solution, where the volume of mutate probes in the wild-type detection solution is 0, and the volume of wild-type probes in the mutant detection solution is 0.

Further, the present disclosure also comprises a specific plasmid fragment synthesized by detecting a target gene. The specific plasmid fragment is used as a positive reference. The positive reference comprises a wild-type positive reference and a mutant positive reference. The specific plasmid fragment in the present disclosure is synthesized by Beijing Qingke Biotechnology Co., Ltd, and the specific sequences are as shown in SEQ ID NO. 17 and SEQ ID NO. 18, respectively.

The nucleotide sequence (3'-5') of the sequence SEQ ID NO.17 (wild-type positive reference) comprises:

TTTCATTCTGTACAAGAGCAAGAATCGCGTGAGGGCGTGCAAGAACGTGT

GCAAGCATCAAGGAGGCCTGTTCATAAAAGACATAGAAGATTTAGACGGA

AGGTCTGTCAGATGCACAAAGCACAACTGGAGGTTGGATGTGAGCACCAT

GAAATACGTCAATCCCCCAGGCAGCTTCTGTCAAGACGAACTAGTTGTTG

AAATGGATGAAGAAAATGGACTTTTACTTCTAGAACTGAATCCTCCCAAT

CCCTGGGATTCAGAACCCAGATCTCCTGAACATTTGGCTTTTGGAGAAGT

TGCTAAAGGACCCGACAGACAGCAAGGGCATCATAGARCCTCCAGAGGGG

ACCAAGATCTACAAGGATTCCTGGGACTTTGAACCCTATTTGAACATCTT

GAATGCTGCTGTAGGAGATGAGATATTTCTTCACTCATCCTGGATAAAAG

AATACTTCACTTGGGC.

The nucleotide sequence (3'-5') of the sequence SEQ ID NO.18 (mutant positive reference) comprises:

TTTCATTCTGTACAAGAGCAAGAATCGCGTGAGGGCGTGCAAGAACGTGT

GCAAGCATCAAGGAGTCCTGTTCATAAAAGACATYGAAGATTTAGACGGA

AGGTCTGTCAGATGCACAAAGCACAACTGGAGGTTGGATGTGAGCACCAT

GAAAAACGTCAATCCCCCAGGCAGCTTCTGTCAAGACGAACTAGTTGTTG

AAATGGATGAAGAAAATGGACTTTTACTTCTAGAACTGAATCCTCCCAAT

TCCTGGGATTCAGAACCCAGATCTCCTGAACATTTGGCTTTTGGAGAAGT

-continued

TGCTAAAGGACCCGACAGACAGCAAGGGCATCATAGARCCTCCAGAGGGG

ACCAAGATCTACAAGGATTCCTGGGACTTTGAACCCTATTTGAACATCTT

GAATGCTGCTGTAGGAGATGAGATATTTCTTCACTCATCCTGGATAAAAG

AATACTTCACTTGGGC.

Preferably, the present disclosure also comprises using the above positive references as positive control. Specific information is as follows:

The wild-type positive reference is prepared into a wild-type positive quality control product according to a final concentration of $10^5$-$10^7$ copies/mL.

The mutant positive reference is prepared into a mutant positive quality control product according to a final concentration of $10^5$-$10^7$ copies/mL.

Preferably, both the above wild-type positive reference and the mutant positive reference are diluted and prepared by using TE buffer as a solvent.

The wild-type detection solution detects the wild-type reference, and the detection results are as follows: FAM, VIC, ROX and CY5 four fluorescence channels are all positive; the wild-type detection solution detects the mutant reference, and the detection results are as follows: FAM, VIC, ROX and CY5 four fluorescence channels are all negative; the mutant detection solution detects the wild-type reference, and the detection results are as follows: FAM, VIC, ROX and CY5 four fluorescence channels are all negative; the mutant detection solution detects the mutant reference, and the detection results are as follows: FAM, VIC, ROX and CY5 four fluorescence channels are all positive; the wild-type positive reference and the mutant positive reference are respectively applied as the wild-type positive quality control product and the mutant positive quality control product for determining whether experimental results are under control.

Further, the detection of nucleic acid detection limit is also conducted in the present disclosure, specifically comprising:

The wild-type positive reference and the mutant positive reference are respectively diluted to 5000 copies/ml, 2000 copies/ml, 1000 copies/mL and 800 copies/mL, and then detection is repeated 20 times using the wild-type detection solution and the mutant detection solution, where the detection rate at 1000 copies/mL concentration is 95%, and therefore the detection limit for detecting the minimum nucleic acid concentration using the technical solution of the present disclosure is set as 1000 copies/mL.

Nucleic acid extraction: the obtained cat oral swab sample is subjected to nucleic acid extraction (template DNA) as a to-be-detected sample. The extraction step of this part is the existing technology. The extraction is performed by using a commercially available nucleic acid extraction reagent, and the specific extraction method is operated according to the instruction.

Nucleic acid sampling: the extracted nucleic acid, a positive reference and a blank control (negative sample) are respectively added into 8 consecutive tubes containing the wild-type detection solution and the mutant detection solution in a volume of 10 μL, and then undergo vibration centrifugation after sealing.

10 μL of nucleic acid of the to-be-detected sample is respectively added into the wild-type detection solution and the mutant detection solution that are prepared, vibrated and mixed well, and finally running is performed on a fluorescent PCR instrument according to a preset reaction program.

The above fluorescent PCR instrument comprises a fluorescent quantitative PCR device adaptive to set parameters of a reaction program in the present disclosure.

Specifically, the program runs: the above reaction tube is placed on a real-time fluorescent PCR instrument, and the real-time fluorescent PCR instrument runs according to the following set program:

Step ①: 95° C.×5 min, running for 1 cycle;
Step ②: 95° C.×5 s; 60° C.×20 s; running for 45 cycles.
In step ②, FAM, VIC, ROX and CY5 are set for fluorescence collection when 60° C.×20 s.

It is specially noted that the ABI7500 fluorescent PCR instrument does not select ROX calibration, and the quenching group is selected as None.

Result analysis: first, whether there is an amplification signal is analyzed. If there is no amplification signal, the to-be-detected sample is interpreted as negative; if there is an amplification signal, the to-be-detected sample is interpreted as positive.

Result Interpretation:

In the present disclosure, a gene site detected in FAM channel is 179G>T; a gene site detected in VIC channel is 268T-A; a gene site detected in ROX channel is 364C-T, and a gene site detected in CY5 channel is 1322delT. Where, the wild-type detection solution detects a wild-type site, and the mutant detection solution detects whether the site is mutated.

Positive determination value: through detection of a critical positive sample and a negative sample, an ROC curve is plotted by using a statistical method, and a positive determination value is determined by using Youden index. Where, the detection result is interpreted as positive when Ct≤40, and the detection result is interpreted as negative when not detected.

TABLE 3

Result interpretation corresponding to cat blood types corresponding to SNP site genotypings

| Blood type | 179G > T | 268T > A | 364C > T | 1322delT |
|---|---|---|---|---|
| Type A | GG | TT | CC | TT |
| Type A carrying type B | GG | TA | CC | TT |
|  | GT | TT | CC | TT |
|  | GG | TT | CC | T- |
| Type A carrying type AB | GG | TT | CT | TT |
| Type AB carrying type B | GG | TA | CT | TT |
|  | GG | TT | CC | T- |
| Type AB | GG | TT | TT | TT |
| Type B | GG | AA | CC | TT |
|  | TT | TT | CC | TT |
|  | GG | TT | CC | -- |
|  | GT | TA | CC | TT |
|  | GG | TA | CC | T- |
|  | GT | TT | CC | T- |

The interpretation method of cat blood types corresponding to the above 4 SNP site genotypings is the same as that provided in patent CN115717170A. The specific interpretation method is seen in Table 3.

The experimental methods in the following example, unless otherwise specified, are all conventional methods.

Materials, reagents and the like used in the following example, unless otherwise specified, are all commercially available, and PCR reagents in the present disclosure are all from Suzhou Xinhai Biotechnology Co., Ltd.

The technical solution of the present disclosure will be described in detail through a specific example.

Example 1

This example provided a cat blood type detection method, specifically comprising:
1. Design of Primers and Probes Four groups of primers and probes are designed according to a cat CMAH gene; where the four groups of primers comprise a first group of forward primer 179F and reverse primer 179R for detecting 179G>T, a second group of forward primer 268T and reverse primer 268R for detecting 268T>A, a third group of forward primer 364F and reverse primer 364R for detecting 364C>T, and a fourth group of forward primer 1322F and reverse primer 1322R for detecting 1322delT. Further, eight probes (four groups of probes) are designed according to the SNP change of the CMAH gene, two of the probes are wild-type probe 179WP and mutant probe 179MP used for detecting 179G>T, two of the probes are wild-type probe 268WP and mutant probe 268MP used for detecting 268T>A, two of the probes are wild-type probe 364WP and mutant probe 364MP for detecting 364C>T, and two of the probes are wild-type probe 1322WP and mutant probe 1322MP used for detecting 1322delT.

Four groups of primers are designed according to the four SNP sites of the cat CMAH gene, respectively comprising:
  A first group of primers comprising 179F and 179R for detecting 179G>T;
  A second group of primers comprising 268F and 268R for detecting 268T>A;
  A third group of primers comprising 364F and 364R for detecting 364C>T;
  A fourth group of primers comprising 1322F and 1322R for detecting 1322delT;
  The sequences of the primers with names 179F, 179R, 268F, 268R, 364F, 364R, 1322F and 1322R respectively correspond to SEQ ID NO.1, SEQ ID NO.2, SEQ ID NO.5, SEQ ID NO.6, SEQ ID NO.9, SEQ ID NO.10, SEQ ID NO.13 and SEQ ID NO.14, respectively. The specific sequences are seen in Table 1.

Four groups of probes are designed according to the mutation of the four SNP sites of the cat CMAH gene, respectively comprising:
  A first group of probes comprising 179WP and 179MP for detecting 179G>T;
  A second group of probes comprising 268WP and 268MP for detecting 268T>A;
  A third group of primers comprising 364WP and 364MP for detecting 364C>T;
  A fourth group of primers comprising 1322WP and 1322MP for detecting 1322delT;
  The probes with names 179WP, 268WP, 364WP and 1322WP belong to wild-type probes and have the sequences of SEQ ID NO.3, SEQ ID NO.7, SEQ ID NO.11, and SEQ ID NO.15, respectively. The probes with names 179MP, 268MP, 364MP and 1322MP belong to mutant probes and have the sequences of SEQ ID NO.4, SEQ ID NO.8, SEQ ID NO.12, and SEQ ID NO.16, respectively. The specific sequences are seen in Table 1.

2. DNA Extraction

Nucleic acid in a to-be-detected sample is extracted. In this example, the supernatant obtained by performing thermal cracking on the cat oral swab for 5 min through lysate is used as a to-be-detected sample. In this example, the cat blood type of the selected to-be-detected sample is known type A.

Each 50 mL of the above lysate contains 15 μL of 10 mmol/L NaCl, 15 μL of 10 mmol/L EDTA-2Na (disodium ethylene diamine tetraacetate) and 350 μL of NP-40 (ethylphenyl polyethylene glycol), the pH is adjusted to 8.0 by using Tris-HCl buffer, and finally the volume is supplemented to 50 mL by using ultrapure water.

3. Synthesis of Positive Reference

The positive reference is a specific plasmid fragment synthesized by detecting a target gene, comprising a wild-type positive reference and a mutant positive reference, where the specific plasmid fragment is synthesized by Beijing Qingke Biotechnology Co., Ltd. The specific sequences are as shown in SEQ ID NO.17 and SEQ ID NO.18, respectively.

The wild-type positive reference is prepared into a wild-type positive quality control product according to a final concentration of $10^6$ copies/mL.

The mutant positive reference is prepared into a mutant positive quality control product according to a final concentration of $10^6$ copies/mL.

4. Nucleic acid sampling: a to-be-detected sample, a wild-type positive quality control product, a mutant positive quality control product and a blank control sample are respectively added into 8 consecutive tubes containing the wild-type detection solution and the mutant detection solution in a volume of 10 μL, and then undergo vibration centrifugation after sealing.

Procedure running: the above reaction tubes are placed on a real-time fluorescent PCR instrument. The real-time fluorescent PCR instrument run according to the following set procedures:
  Step ①: 95° C.×5 min, running for 1 cycle;
  Step ②: 95° C.×5 s; 60° C.×20 s; running for 45 cycles.
  In step 2, FAM channel, VIC channel, ROX channel and CY5 channel were set when 60° C.×20 s for fluorescent collection to obtain a fluorogram.

Result analysis: whether there is an amplification signal in the fluorogram is analyzed, the result is interpreted as negative if there is no amplification signal, and a nucleic acid template in a corresponding sample is interpreted as negative if there is an amplification signal.

Result interpretation: in this example, a gene site detected in FAM channel is 179G>T; a gene site detected in VIC channel is 268T-A; a gene site detected in ROX channel is 364C-T, and a gene site detected in CY5 channel is 1322delT; where the wild-type detection solution detects a wild-type site, and the mutant detection solution detects whether the site is mutated.

Referring to FIG. 5-FIG. 12, FIG. 5-FIG. 12 are graphs showing amplification curve results of a wild-type detection positive reference and a mutant positive reference detected by using a wild-type detection solution as well as a wild-type positive reference and a mutant positive reference detected by using a mutant detection solution in FAM channel, VIC channel, CY5 channel and ROX channel in this example.

Figure 5:
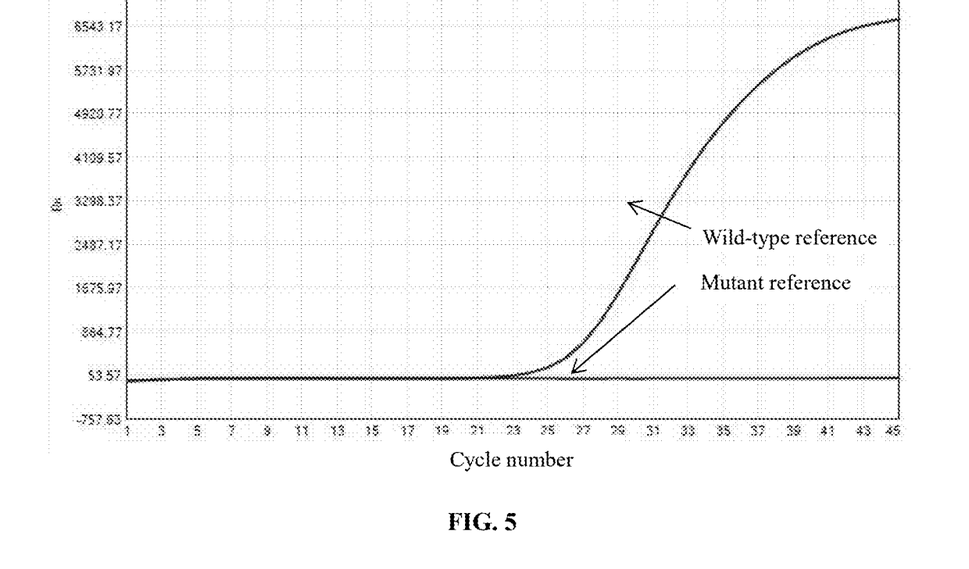
FIG. 5 is a graph showing amplification curve results of a wild-type positive reference and a mutant positive reference detected by using a wild-type detection solution in example 1 in FAM channel according to the present disclosure.

FIG. 5 is a graph showing amplification curve results of a wild-type detection positive reference and a mutant positive reference detected by using a wild-type detection solution in FAM channel, where the wild-type positive reference Ct≤40 and the mutant positive reference have no amplification curves, and therefore the base of the wild-type positive reference in 179 gene site is interpreted as G, and the base of the mutant positive reference in 179 gene site is interpreted as T.

Figure 6:
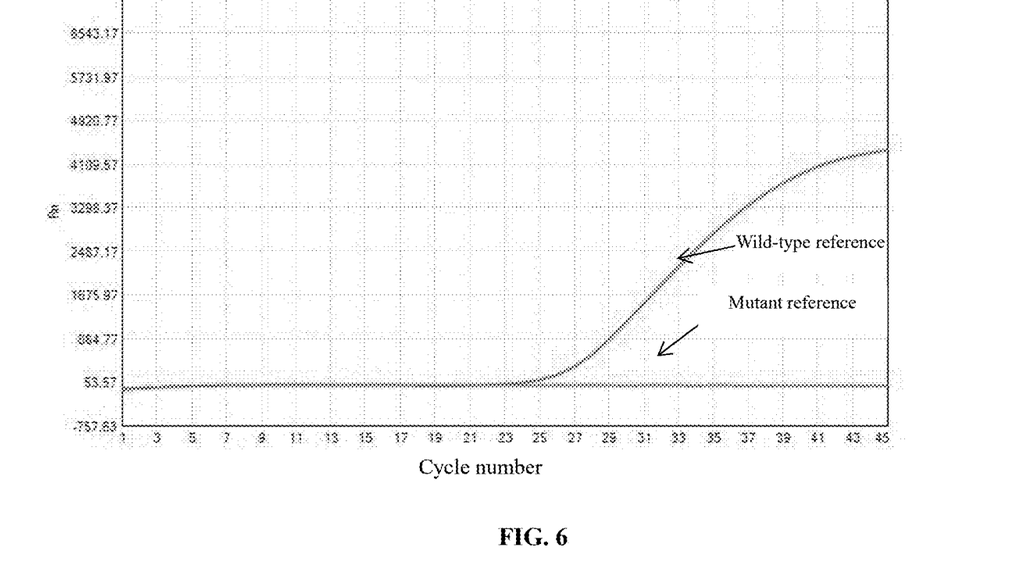
FIG. 6 is a graph showing amplification curve results of a wild-type positive reference and a mutant positive reference detected by using a wild-type detection solution in example 1 in VIC channel according to the present disclosure.

FIG. 6 is a graph showing amplification curve results of a wild-type detection positive reference and a mutant positive reference detected by using a wild-type detection solution in VIC channel, where the wild-type positive reference Ct≤40 and the mutant positive reference have no amplification curves, and therefore the base of the wild-type positive reference in 268 gene site is interpreted as T, and the base of the mutant positive reference in 179 gene site is interpreted as A.

Figure 7:
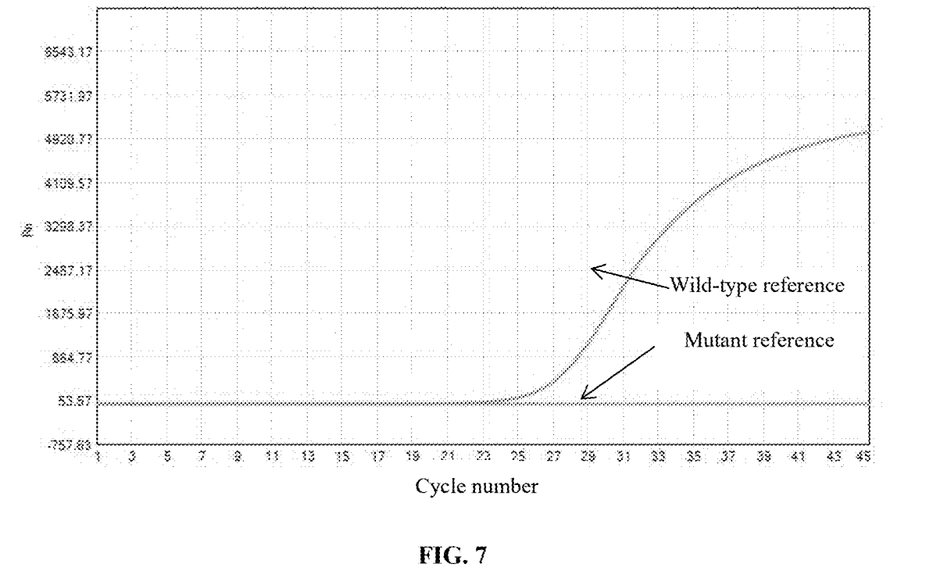
FIG. 7 is a graph showing amplification curve results of a wild-type positive reference and a mutant positive reference detected by using a wild-type detection solution in example 1 in ROX channel according to the present disclosure.

FIG. 7 is a graph showing amplification curve results of a wild-type detection positive reference and a mutant positive reference detected by using a wild-type detection solution in ROX channel, where the wild-type positive reference Ct≤40 and the mutant positive reference have no amplification curves, and therefore the base of the wild-type positive reference in 364 gene site is interpreted as C, and the base of the mutant positive reference in 364 gene site is interpreted as T.

Figure 8:
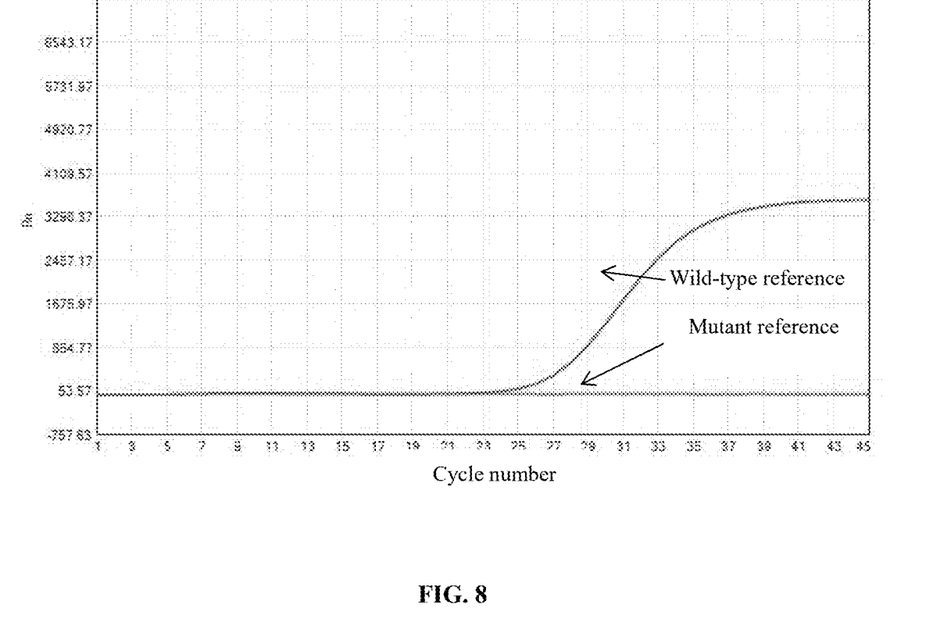
FIG. 8 is a graph showing amplification curve results of a wild-type positive reference and a mutant positive reference detected by using a wild-type detection solution in example 1 in CY5 channel according to the present disclosure.

FIG. 8 is a graph showing amplification curve results of a wild-type detection positive reference and a mutant positive reference detected by using a wild-type detection solution in CY5 channel, where the wild-type positive reference Ct≤40 and the mutant positive reference have no amplification curves, and therefore the wild-type positive reference does not lack T in 1322 gene site, and the mutant positive reference lacks base T in 1322 gene site.

Figure 9:
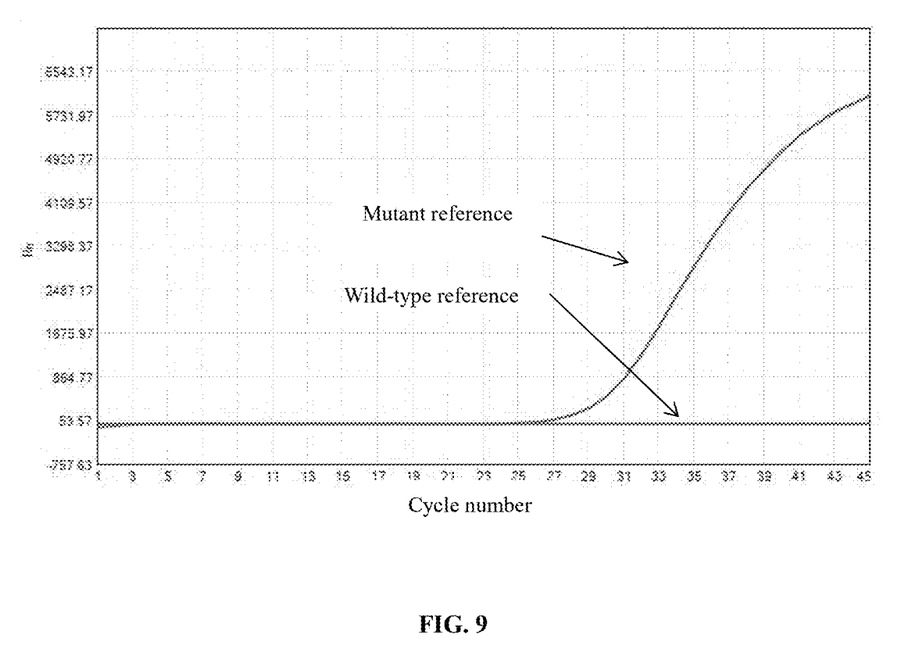
FIG. 9 is a graph showing amplification curve results of a wild-type positive reference and a mutant positive reference detected by using a mutant detection solution in example 1 in FAM channel according to the present disclosure.

FIG. 9 is a graph showing amplification curve results of a wild-type detection positive reference and a mutant positive reference detected by using a mutant detection solution in FAM channel, where the wild-type positive reference Ct≤40 and the mutant positive reference have no amplification curves, and therefore the base of the wild-type positive reference in 179 gene site is interpreted as G, and the mutant positive reference in 179 gene site is interpreted as T.

Figure 10:
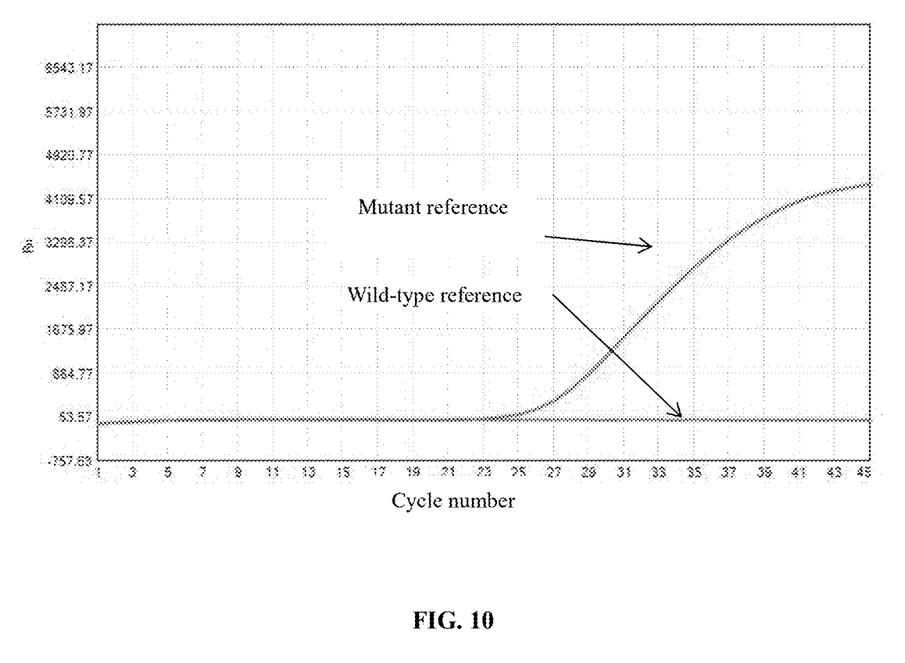
FIG. 10 is a graph showing amplification curve results of a wild-type positive reference and a mutant positive reference detected by using a mutant detection solution in example 1 in VIC channel according to the present disclosure.

FIG. 10 is a graph showing amplification curve results of a wild-type detection positive reference and a mutant positive reference detected by using a mutant detection solution in VIC channel, where the wild-type positive reference Ct≤40 and the mutant positive reference have no amplification curves, and therefore the base of the wild-type positive reference in 268 gene site is interpreted as T, and the mutant positive reference in 268 gene site is interpreted as A.

Figure 11:
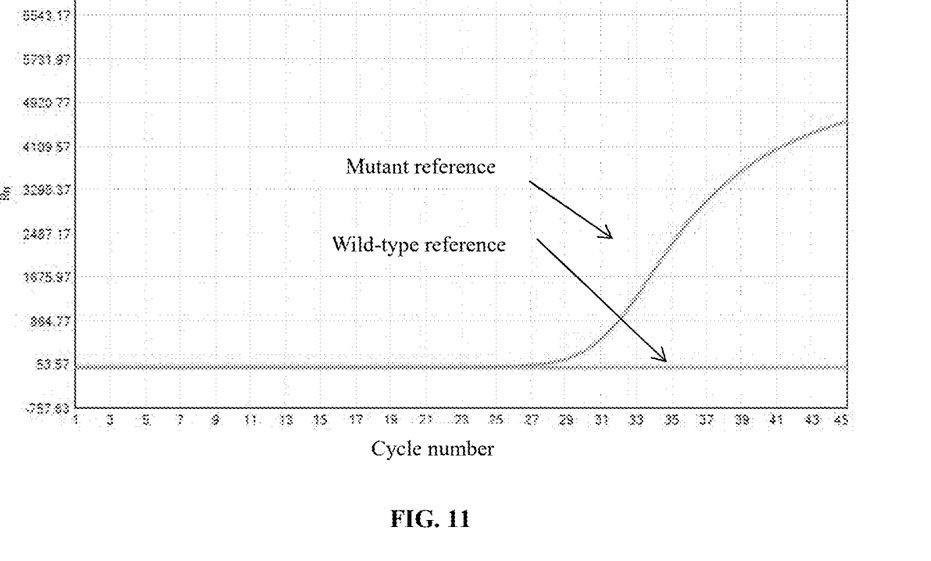
FIG. 11 is a graph showing amplification curve results of a wild-type positive reference and a mutant positive reference detected by using a mutant detection solution in example 1 in ROX channel according to the present disclosure.

FIG. 11 is a graph showing amplification curve results of a wild-type detection positive reference and a mutant positive reference detected by using a mutant detection solution in ROX channel, where the wild-type positive reference Ct≤40 and the mutant positive reference have no amplification curves, and therefore the base of the wild-type positive reference in 364 gene site is interpreted as C, and the mutant positive reference in 364 gene site is interpreted as T.

Figure 12:
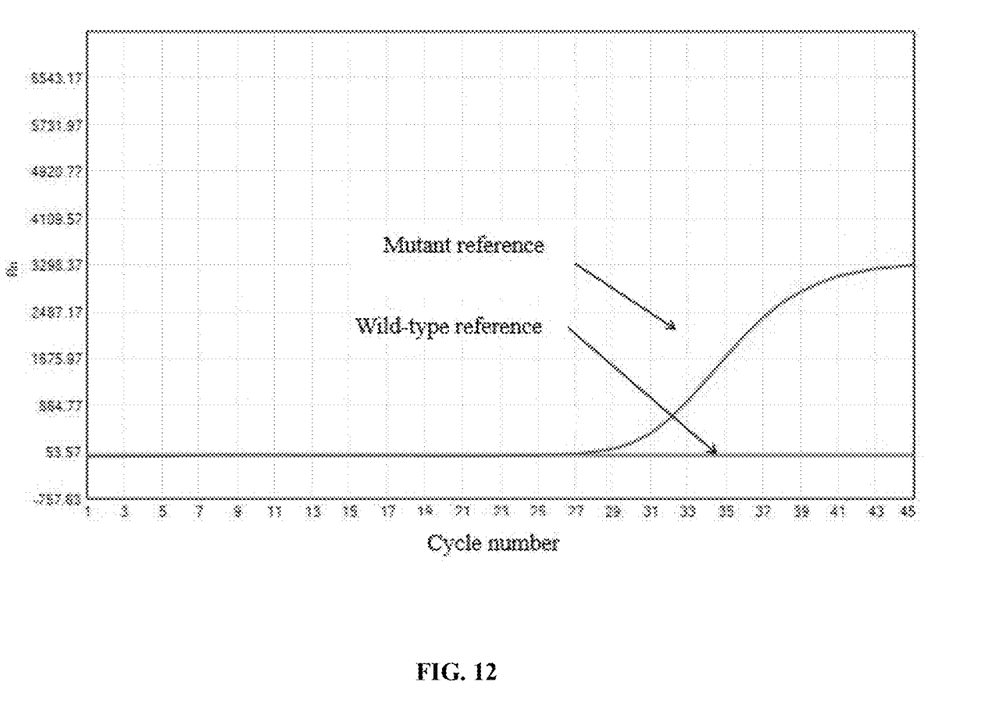
FIG. 12 is a graph showing amplification curve results of a wild-type positive reference and a mutant positive reference detected by using a mutant detection solution in example 1 in CY5 channel according to the present disclosure.

FIG. 12 is a graph showing amplification curve results of a wild-type detection positive reference and a mutant positive reference detected by using a mutant detection solution in CY5 channel, where the wild-type positive reference Ct≤40 and the mutant positive reference have no amplification curves, and therefore it is interpreted that the wild-type positive reference does not lack T in 1322 gene site and the mutant positive reference lacks T in 1322 gene site.

By analysis on the above atlas, the bases of the wild-type positive reference in the above four gene sites are respectively 179G homozygous, 268T homozygous, 364C homozygous and 1322 homozygous, without the lack of T; the bases of the mutant positive reference in the above four gene sites are respectively 179T homozygous, 268A homozygous, 364T homozygous and 1322 homozygous, with the lack of T; the wild-type detection solution detects the wild-type reference, and the detection results are as follows: FAM, VIC, ROX and CY5 four fluorescence channels are all positive; the wild-type detection solution detects the mutant reference, and the detection results are as follows: FAM, VIC, ROX and CY5 four fluorescence channels are all negative; the mutant detection solution detects the wild-type reference, and the detection results are as follows: FAM, VIC, ROX and CY5 four fluorescence channels are all negative; the mutant detection solution detects the mutant reference, and the detection results are as follows: FAM, VIC, ROX and CY5 four fluorescence channels are all positive; the wild-type positive reference and the mutant reference are respectively applied as the wild-type positive quality control product and the mutant positive quality control product, and the experimental results are determined as being under control.

Figure 13:
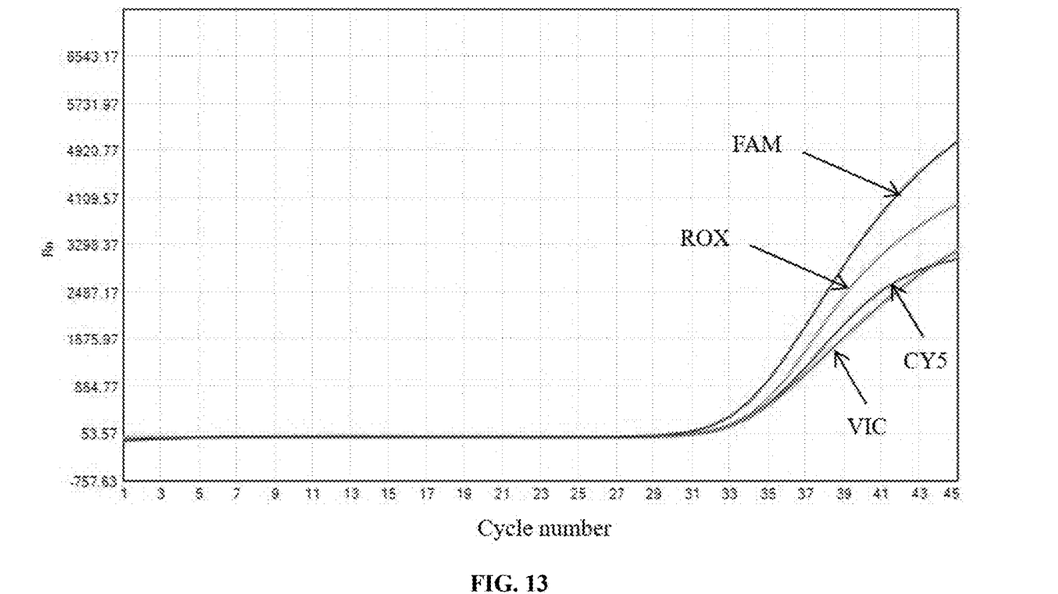
FIG. 13 is a graph showing amplification curve results of a to-be-detected sample detected by using a wild-type detection solution in example 1 in FAM channel, VIC channel, CY5 channel and ROX channel.
Figure 14:
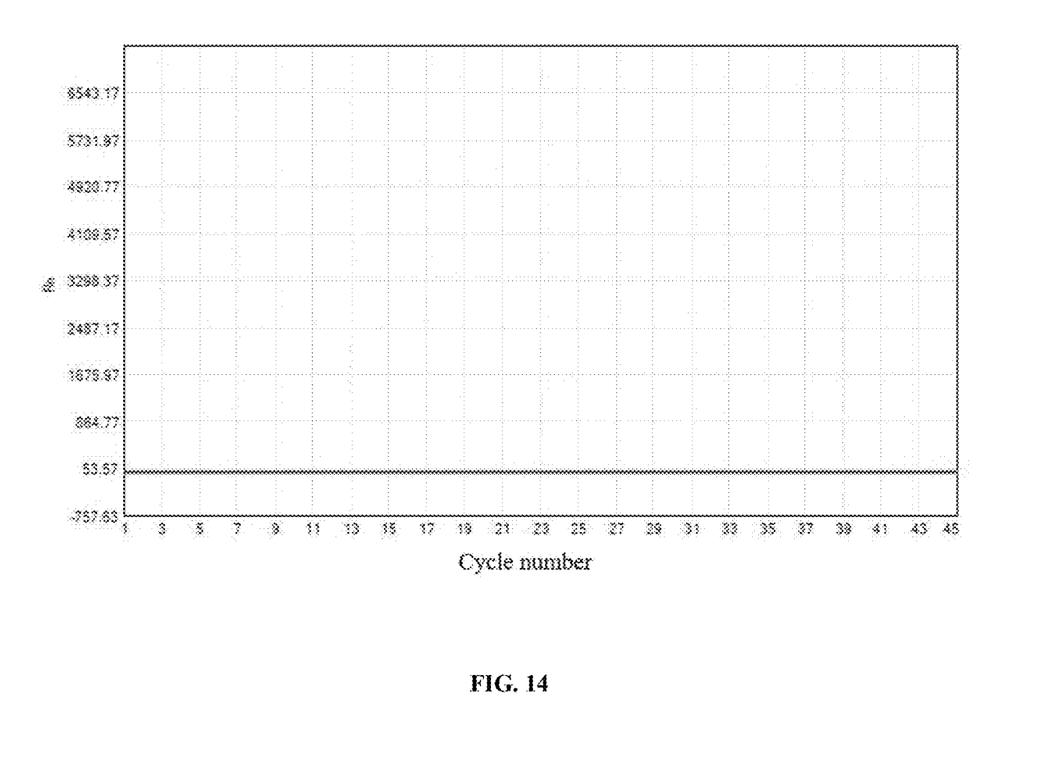
FIG. 14 is a graph showing amplification curve results of a to-be-detected sample detected by using a mutant detection solution in example 1 in FAM channel, VIC channel, CY5 channel and ROX channel.

Referring to FIGS. 13-14, FIGS. 13-14 are graphs showing amplification curve results of a to-be-detected sample detected by a wild-type detection solution and a to-be-detected sample detected by a mutant detection solution in FAM channel, VIC channel, CY5 channel and ROX channel in this example.

Referring to FIG. 13, FIG. 13 shows the results of the to-be-detected sample detected by the wild-type detection solution. The results show that in wild-type detection, four fluorescence channels FAM, VIC, ROX and CY5 are all positive.

Referring to FIG. 14, FIG. 14 shows the results of the to-be-detected sample detected by the mutant detection solution. The results show that wild-type four fluorescence channels are all positive, and mutant four fluorescence channels are all negative.

It can be seen by analysis of the above atlas that the to-be-detected sample is a type A homozygote, the determination result of the cat blood type is consistent to that of the analysis method used in example 1, indicating that the method for the detection analysis of the cat blood type using the technical solution of the present disclosure is reliable.

Based on the technical solution provided by the example, the technical solution can be further applied to determination of whether the CMAH gene is homozygous. The determination method comprises simultaneous detection of a sample through a wild-type reagent and a mutant reagent to determine whether the CMAH gene is homozygous. The specific principle is as follows: the homozygote refers to a genotype individual with two identical alleles at the same site on homologous chromosomes in a diploid; the heterozygote refers to a genotype individual with different alleles at the same site on homologous chromosomes in a diploid; if the wild-type and mutant detections in the sample are both interpreted as positive, that is, the two alleles at the same site are different, which are not only wild-type but also mutant, indicating that the detection site of this sample is heterozygous; if the wild-type detection in the sample is interpreted as positive and the mutation detection is interpreted as negative, that is, the alleles at the same site are the same, which are both wild-type, indicating that the detection site of this sample is dominant homozygous; if the wild-type detection in the sample is interpreted as negative and the mutant detection is interpreted as positive, that is, the alleles at the same site are the same, which are both mutant, indicating that the detection site of this sample is recessive homozygous.

The above description is only a preferred embodiment of the present disclosure, but is not intended to limiting the scope of protection of the present disclosure. For those skilled in the art, various variations and changes can be made to the present disclosure. Variations, modifications, replacements, integrations and parameter changes made without departing from the principle and spirit of the present disclosure through conventional replacements or by achieving the same functions within the spirit and principle of the present disclosure are all included within the scope of protection of the present disclosure.

What is claimed is:

1. A cat blood type detection method, comprising:
performing PCR reaction using a nucleic acid extracted from a cat oral swab sample as template DNA, employing a primer and probe composition, and
directly performing fluorescence collection without taking out a PCR reaction product after the PCR reaction is completed; and
detecting and analyzing whether a cat cytidine monophospho-N-acetylneuraminic acid (CMAH) gene has the single nucleotide polymorphism (SNP) mutation of 179G>T, 268T>A, 364C>T and 1322delT four sites by using a real time fluorescence PCR technology, thereby achieving the cat blood type detection;
the primer and probe composition comprising four groups of primers and four groups of probes:
a first group of primers comprising a forward primer comprising a sequence of SEQ ID NO. 1, and a reverse primer comprising a sequence of SEQ ID NO.2;
a second group of primers comprising a forward primer comprising a sequence of SEQ ID NO.5, and a reverse primer comprising a sequence of SEQ ID NO.6;
a third group of primers comprising a forward primer comprising a sequence of SEQ ID NO.9 and a reverse primer comprising a sequence of SEQ ID NO.10;
a fourth group of primers comprising a forward primer comprising a sequence of SEQ ID NO. 13, and a reverse primer comprising a sequence of SEQ ID NO.14;
a first group of probes comprising a wild-type probe comprising a sequence of SEQ ID NO.3, and a mutant probe comprising a sequence of SEQ ID NO.4;
a second group of probes comprising a wild-type probe comprising a sequence of SEQ ID NO.7, and a mutant probe comprising a sequence of SEQ ID NO.8;
a third group of probes comprising a wild-type probe comprising a sequence of SEQ ID NO.11, and a mutant probe comprising a sequence of SEQ ID NO.12; and
a fourth group of probes comprising a wild-type probe comprising a sequence of SEQ ID NO.15, and a mutant probe comprising a sequence of SEQ ID NO.16.

2. The cat blood type detection method according to claim 1, further comprising: determining a detection result of the sample to be negative if an amplification signal is not obtained during the PCR reaction by utilizing real-time fluorescence PCR, conversely, determining the detection result of the sample to be positive if the amplification signal is obtained by utilizing the real-time fluorescence PCR.

3. The cat blood type detection method according to claim 1, further comprising the following steps of:

preparing a primer and probe in the primer and probe composition for detecting a wild-type site into a wild-type detection solution, and preparing a primer and probe for detecting a mutant site into a mutant detection solution; and
respectively mixing a to-be-detected sample containing the template DNA with the wild-type detection solution and the mutant detection solution, then respectively performing the detection of a wild-type site and a mutant site by utilizing the real-time fluorescence PCR technology, and determining the cat blood type according to the two obtained detection results of the wild-type site and the mutant site.

4. The cat blood type detection method according to claim 3, further comprising:
respectively preparing a wild-type positive reference and a mutant positive reference into a wild-type positive quality control product and a mutant positive quality control product at a final concentration of $10^5$-$10^7$ copies/ml;
wherein the wild-type positive reference comprises a wild-type specific plasmid fragment comprising a sequence of SEQ ID NO.17, and the mutant positive reference comprises a mutant specific plasmid fragment comprising a sequence of SEQ ID NO.18;
the wild-type detection solution detects the wild-type positive reference, and the detection results are as follows: four fluorescence channels FAM, VIC, ROX and CY5 are all positive;
the wild-type detection solution detects the mutant positive reference, and the detection results are as follows: four fluorescence channels FAM, VIC, ROX and CY5 four fluorescence channels are all negative;
the mutant detection solution detects the wild-type positive reference, and the detection results are as follows: four fluorescence channels FAM, VIC, ROX and CY5 are all negative;
the mutant detection solution detects the mutant positive reference, and the detection results are as follows: four fluorescence channels FAM, VIC, ROX and CY5 are all positive;
the wild-type positive reference and the mutant positive reference are respectively applied as the wild-type positive quality control product and the mutant positive quality control product for determining whether experimental results are under control.

5. The cat blood type detection method according to claim 4, further comprising:
respectively mixing the to-be-detected sample, the wild-type positive reference, the mutant positive reference and a blank control sample with the wild-type detection solution and the mutant detection solution to prepare multiple groups of samples;
respectively placing the multiple groups of samples in a real-time fluorescence PCR instrument which runs according to the following set procedures:
step ①: 95° C.×5 min, running for 1 cycle;

step ②: 95° C.×5 s; 60° C.×20 s; running for 45 cycles;
in step ②, respectively setting the FAM channel, the VIC channel, the ROX channel and the CY5 channel when 60° C.×20 s for fluorescence collection, wherein the sites of a cat CMAH gene detected by the VIC channel, the ROX channel and the CY5 channel respectively correspond to 179G >T, 268T>A, 364C>T and 1322delT; and
analyzing fluorescence collection results, including: the detection result is interpreted as positive when Ct≤40 in the detection result; the detection result is interpreted as negative when Ct is not detected in the detection result.

6. A cat blood type detection reagent adopting the cat blood type detection method according to claim 1,
wherein the cat blood type detection reagent comprises primer and probe compositions as shown in SEQ ID NO.1-SEQ ID NO.16, and the primer and probe compositions comprise:
a first group of primers comprising a forward primer comprising a sequence of SEQ ID NO.1 and a reverse primer comprising a sequence of SEQ ID NO.2;
a second group of primers comprising a forward primer comprising a sequence of SEQ ID NO.5 and a reverse primer comprising a sequence of SEQ ID NO.6;
a third group of primers comprising a forward primer comprising a sequence of SEQ ID NO.9 and a reverse primer comprising a sequence of SEQ ID NO.10;
a fourth group of primers comprising a forward primer comprising a sequence of SEQ ID NO.13 and a reverse primer comprising a sequence of SEQ ID NO.14;
a first group of probes comprising a wild-type probe comprising a sequence of SEQ ID NO.3 and a mutant probe comprising a sequence of SEQ ID NO.4;
a second group of probes comprising a wild-type probe comprising a sequence of SEQ ID NO.7 and a mutant probe comprising a sequence of SEQ ID NO.8;
a third group of probes comprising a wild-type probe comprising a sequence of SEQ ID NO.11 and a mutant probe comprising a sequence of SEQ ID NO.12; and
a fourth group of probes comprising a wild-type probe having comprising a sequence of SEQ ID NO.15 and a mutant probe comprising a sequence of SEQ ID NO.16.

7. The cat blood type detection reagent according to claim 6, further comprising a positive reference; the positive reference comprising a wild-type positive reference and a mutant positive reference; the wild-type positive reference comprising a wild-type specific plasmid fragment comprising a sequence of SEQ ID NO.17; and the mutant positive reference comprising a mutant specific plasmid fragment comprising a sequence of SEQ ID NO.18.

8. Use of a cat blood type detection method in identifying whether a cat CMAH gene is homozygous, the cat blood type detection method comprising: performing PCR reaction using a nucleic acid extracted from a cat oral swab sample as template DNA, employing a primer and probe composition, and
directly performing fluorescence collection without taking out a PCR reaction product after the PCR reaction is completed; and
detecting and analyzing whether a cat CMAH gene has the SNP mutation of 179G>T, 268T>A, 364C>T and 1322delT four sites by using a real time fluorescence PCR technology, thereby achieving the cat blood type detection;
the primer and probe composition comprising four groups of primers and four groups of probes:
a first group of primers comprising a forward primer comprising a sequence of SEQ ID NO.1 and a reverse primer comprising a sequence of SEQ ID NO.2;
a second group of primers comprising a forward primer comprising a sequence of SEQ ID NO.5 and a reverse primer comprising a sequence of SEQ ID NO.6;
a third group of primers comprising a forward primer comprising a sequence of SEQ ID NO.9 and a reverse primer comprising a sequence of SEQ ID NO.10;
a fourth group of primers comprising a forward primer comprising a sequence of SEQ ID NO.13 and a reverse primer comprising a sequence of SEQ ID NO.14;
a first group of probes comprising a wild-type probe comprising a sequence of SEQ ID NO.3 and a mutant probe comprising a sequence of SEQ ID NO.4;
a second group of probes comprising a wild-type probe comprising a sequence of SEQ ID NO.7 and a mutant probe comprising a sequence of SEQ ID NO.8;
a third group of probes comprising a wild-type probe comprising a sequence of SEQ ID NO.11 and a mutant probe comprising a sequence of SEQ ID NO.12; and
a fourth group of probes comprising a wild-type probe comprising a sequence of SEQ ID NO.15 and a mutant probe comprising a sequence of SEQ ID NO.16;
wherein identifying whether a cat CMAH gene is homozygous, comprising: simultaneously detecting the sample through a wild-type reagent and a mutant reagent to determine whether the CMAH gene is homozygous; if a detection result of the wild-type in the sample and a detection result of the mutant in the sample are both positive, a detection site of this sample is heterozygous; if the detection result of the wild-type in the sample is positive and the detection result of the mutation in the sample is negative, a detection site of this sample is dominant homozygous; if the detection result of the wild-type in the sample is negative and the mutant in the sample is positive, a detection site of this sample is recessive homozygous.

9. The use of the cat blood type detection method in identifying whether the cat CMAH gene is homozygous according to claim 8, further comprising:
determining a detection result of the sample to be negative if an amplification signal is not obtained during the PCR reaction by utilizing real-time fluorescence PCR, conversely,
determining the detection result of the sample is positive if the amplification signal is obtained by utilizing the real-time fluorescence PCR.

10. The use of a cat blood type detection method in identifying whether a cat CMAH gene is homozygous according to claim 8, further comprising the following steps of:
preparing a primer and probe in the primer and probe composition for detecting a wild-type site into a wild-type detection solution, and preparing a primer and probe for detecting a mutant site into a mutant detection solution; and
respectively mixing a to-be-detected sample containing the template DNA with the wild-type detection solution and the mutant detection solution, then respectively performing the detection of a wild-type site and a mutant site by utilizing the real-time fluorescence PCR technology, and determining the cat blood type according to the two obtained detection results of the wild-type site and the mutant site.

11. The use of the cat blood type detection method in identifying whether the cat CMAH gene is homozygous according to claim 10, further comprising:

respectively preparing a wild-type positive reference and a mutant positive reference into a wild-type positive quality control product and a mutant positive quality control product at a final concentration of $10^5$-$10^7$ copies/ml;

wherein the wild-type positive reference comprises a wild-type specific plasmid fragment comprising a sequence of SEQ ID NO.17, and the mutant positive reference comprises a mutant specific plasmid fragment comprising a sequence of SEQ ID NO.18;

the wild-type detection solution detects the wild-type positive reference, and the detection results are as follows: four fluorescence channels FAM, VIC, ROX and CY5 are all positive;

the wild-type detection solution detects the mutant positive reference, and the detection results are as follows: four fluorescence channels FAM, VIC, ROX and CY5 four fluorescence channels are all negative;

the mutant detection solution detects the wild-type positive reference, and the detection results are as follows: four fluorescence channels FAM, VIC, ROX and CY5 are all negative;

the mutant detection solution detects the mutant positive reference, and the detection results are as follows: four fluorescence channels FAM, VIC, ROX and CY5 are all positive;

the wild-type positive reference and the mutant positive reference are respectively applied as the wild-type positive quality control product and the mutant positive quality control product for determining whether experimental results are under control.

12. The use of the cat blood type detection method in identifying whether the cat CMAH gene is homozygous according to claim 11, further comprising:

respectively mixing the to-be-detected sample, the wild-type positive reference, the mutant positive reference and a blank control sample with the wild-type detection solution and the mutant detection solution to prepare multiple groups of samples;

respectively placing the multiple groups of samples in a real-time fluorescence PCR instrument which runs according to the following set procedures:

step ①: 95° C.×5 min, running for 1 cycle;

step ②: 95° C.×5 s; 60° C.×20 s; running for 45 cycles;

in step ②, respectively setting the FAM channel, the VIC channel, the ROX channel and the CY5 channel when 60° C.×20 s for fluorescence collection, wherein the sites of a cat CMAH gene detected by the VIC channel, the ROX channel and the CY5 channel respectively correspond to 179G >T, 268T>A, 364C>T and 1322delT; and analyzing fluorescence collection results, including: the detection result is interpreted as positive when Ct≤40 in the detection result; the detection result is interpreted as negative when Ct is not detected in the detection result.

* * * * *